United States Patent
Yang et al.

(10) Patent No.: US 9,435,939 B2
(45) Date of Patent: Sep. 6, 2016

(54) DISPLAYS WITH COHERENT FIBER BUNDLES

(75) Inventors: Tseng-Mau Yang, Kitchener (CA); Christopher D. Prest, San Francisco, CA (US); Dale N. Memering, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 696 days.

(21) Appl. No.: 13/564,995

(22) Filed: Aug. 2, 2012

(65) Prior Publication Data
US 2014/0037257 A1    Feb. 6, 2014

(51) Int. Cl.
*G02B 6/06* (2006.01)
*F21V 8/00* (2006.01)
*G02F 1/313* (2006.01)
*G02B 6/08* (2006.01)
*G02F 1/01* (2006.01)
*G02B 6/12* (2006.01)

(52) U.S. Cl.
CPC .............. *G02B 6/0078* (2013.01); *G02B 6/08* (2013.01); *G02F 1/3137* (2013.01); *G02B 2006/12145* (2013.01); *G02F 2001/0142* (2013.01)

(58) Field of Classification Search
CPC .......... G02B 6/06; G02B 6/00; G02B 6/001; G02B 6/08
USPC .................... 349/106, 62, 159; 385/115–121
See application file for complete search history.

(56) References Cited

U.S. PATENT DOCUMENTS

| | | |
|---|---|---|
| 4,139,261 A | 2/1979 | Hilsum |
| 4,613,210 A | 9/1986 | Pollard |
| 4,904,049 A | 2/1990 | Hegg |
| 5,465,315 A * | 11/1995 | Sakai et al. .................... 385/116 |
| 6,892,011 B2 | 5/2005 | Walker et al. |
| 6,892,014 B2 * | 5/2005 | Cok et al. ...................... 385/120 |
| 7,228,051 B2 * | 6/2007 | Cok et al. ...................... 385/146 |
| 7,773,849 B2 | 8/2010 | Shani |
| 7,856,161 B2 * | 12/2010 | Tabor ............................. 385/120 |
| 8,666,212 B1 * | 3/2014 | Amirparviz .................... 385/119 |
| 2006/0007054 A1 * | 1/2006 | Chang .............. G02F 1/133524 345/1.3 |
| 2006/0146013 A1 * | 7/2006 | Arneson et al. .............. 345/156 |
| 2007/0052614 A1 * | 3/2007 | Zimmerman .................. 345/1.1 |

FOREIGN PATENT DOCUMENTS

| | | |
|---|---|---|
| EP | 2439582 | 11/2012 |
| WO | 2009122691 | 10/2009 |

OTHER PUBLICATIONS

Schott North America, Introduction to Fiber Optic Imaging, Feb. 2007, Schott North America Inc., Second edition.*

* cited by examiner

*Primary Examiner* — Ryan Lepisto
*Assistant Examiner* — Erin Chiem
(74) *Attorney, Agent, or Firm* — Treyz Law Group, P.C.; G. Victor Treyz; Joseph F. Guihan (57) ABSTRACT

A display may have an array of display pixels that generate an image. A coherent fiber bundle may be mounted on the display pixels. The coherent fiber bundle may have a first surface that is adjacent to the display pixels and a second surface that is visible to a viewer. The coherent fiber bundle may contain fibers that carry light from the first surface to the second surface. The second surface may be planar or may have a central planar region and curved edge regions that run along opposing sides of the central planar region. The fibers may have cross-sectional surface areas with a first aspect ratio on the first surface and a second aspect ratio that is greater than the first aspect ratio on the second surface.

8 Claims, 10 Drawing Sheets

DISPLAYS WITH COHERENT FIBER BUNDLES

BACKGROUND

This relates to electronic devices and, more particularly, to displays for electronic devices.

Electronic devices such as cellular telephones and other portable devices are often provided with displays. In a typical configuration, a rectangular array of display pixels is located in a central active region in the display. An inactive border region surrounds the central active region. Components such as driver circuits can be formed in the inactive border region. The inactive border must generally contain sufficient space for these components, because these components are used in controlling the operation of the display. Nevertheless, excessively large inactive border regions may make a device overly large and may detract from device aesthetics.

It would therefore be desirable to be able to provide improved displays for an electronic device.

SUMMARY

A display may have an array of display pixels that generate an image. The display may be mounted in an electronic device housing in a configuration that minimizes or eliminates the inactive border area surrounding the display.

The display may have a coherent fiber bundle that is mounted on the display pixels. The coherent fiber bundle may have a first surface that is adjacent to the display pixels and a second surface that is visible to a viewer. The coherent fiber bundle may contain fibers that carry light from the first surface to the second surface.

The second surface may be planar or may have a central planar region and curved edge regions that run along opposing sides of the central planar region. The fibers may have cross-sectional surface areas with a first aspect ratio on the first surface and a second aspect ratio that is greater than the first aspect ratio on the second surface.

The display and coherent fiber bundle may have first and second lateral dimensions. The fibers in the coherent fiber bundle may be curved along one of the lateral dimensions and not the other, so as to create an overhang that covers inactive components.

Further features of the invention, its nature and various advantages will be more apparent from the accompanying drawings and the following detailed description of the preferred embodiments.

DETAILED DESCRIPTION

Figure 1:
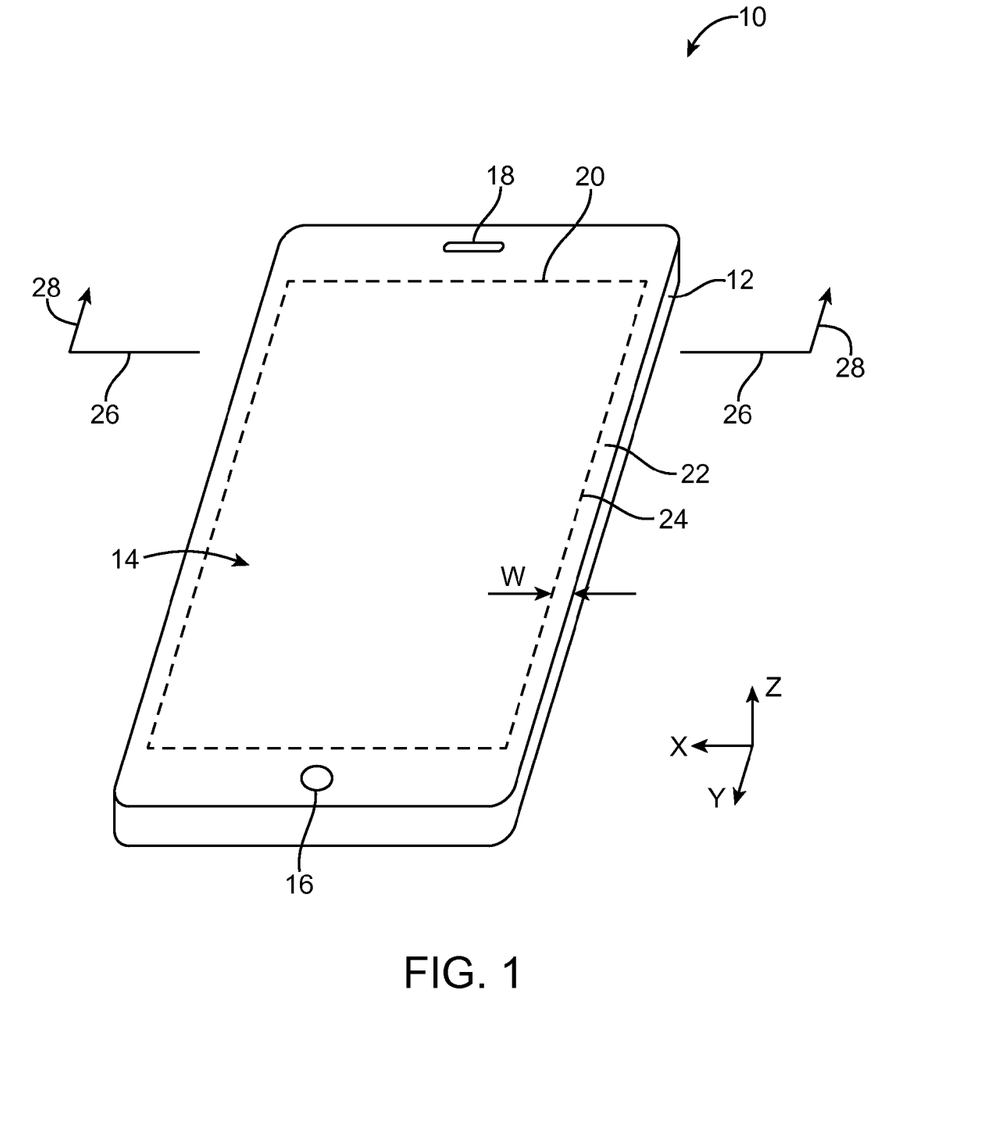
FIG. 1 is a front perspective view of an illustrative electronic device of the type that may be provided with a display in accordance with an embodiment of the present invention.

An illustrative electronic device of the type that may be provided with a display is shown in FIG. 1. Device 10 of FIG. 1 may be a handheld device such as a cellular telephone or media player, a tablet computer, a notebook computer, other portable computing equipment, a wearable or miniature device such as a wristwatch or pendant device, a television, a computer monitor, or other electronic equipment.

As shown in FIG. 1, electronic device 10 may include a display such as display 14. Display 14 may be a touch screen that incorporates a layer of conductive capacitive touch sensor electrodes or other touch sensor components or may be a display that is not touch-sensitive. Display 14 may include an array of display pixels formed from liquid crystal display (LCD) components, an array of electrophoretic display pixels, an array of electrowetting display pixels, or display pixels based on other display technologies.

Display 14 may be protected using an optional display cover layer such as a layer of transparent glass or clear plastic. Openings may be formed in the display cover layer. For example, an opening may be formed in the display cover layer to accommodate a button such as button 16 and an opening such as opening 18 may be used to form a speaker port. Device configurations without openings in display 14 may also be used for device 10.

Device 10 may have a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be characterized by an active region such as rectangular active region 20 (the area inside rectangular dotted line 20). Images may be displayed in the active region using an associated array of display pixels (e.g., backlight LCD cells, organic light-emitting diode cells, or other image-producing display elements). The rectangular active region 20 may be surrounded by an inactive region such as inactive border region 22.

Inactive border region 22 may be characterized by a minimum width W (e.g., along the left and right edges of display 14 of FIG. 1). To minimize the size of width W, display 14 may be provided with a coherent fiber bundle that expands the size of the display along the edges of device 10 (e.g., in lateral dimension X). The size of width W may be reduced to less than 2 mm, less than 1 mm, less than 0.5 mm, less than 0.2 mm, or may be reduced to zero or a negligible amount.

Figure 2:
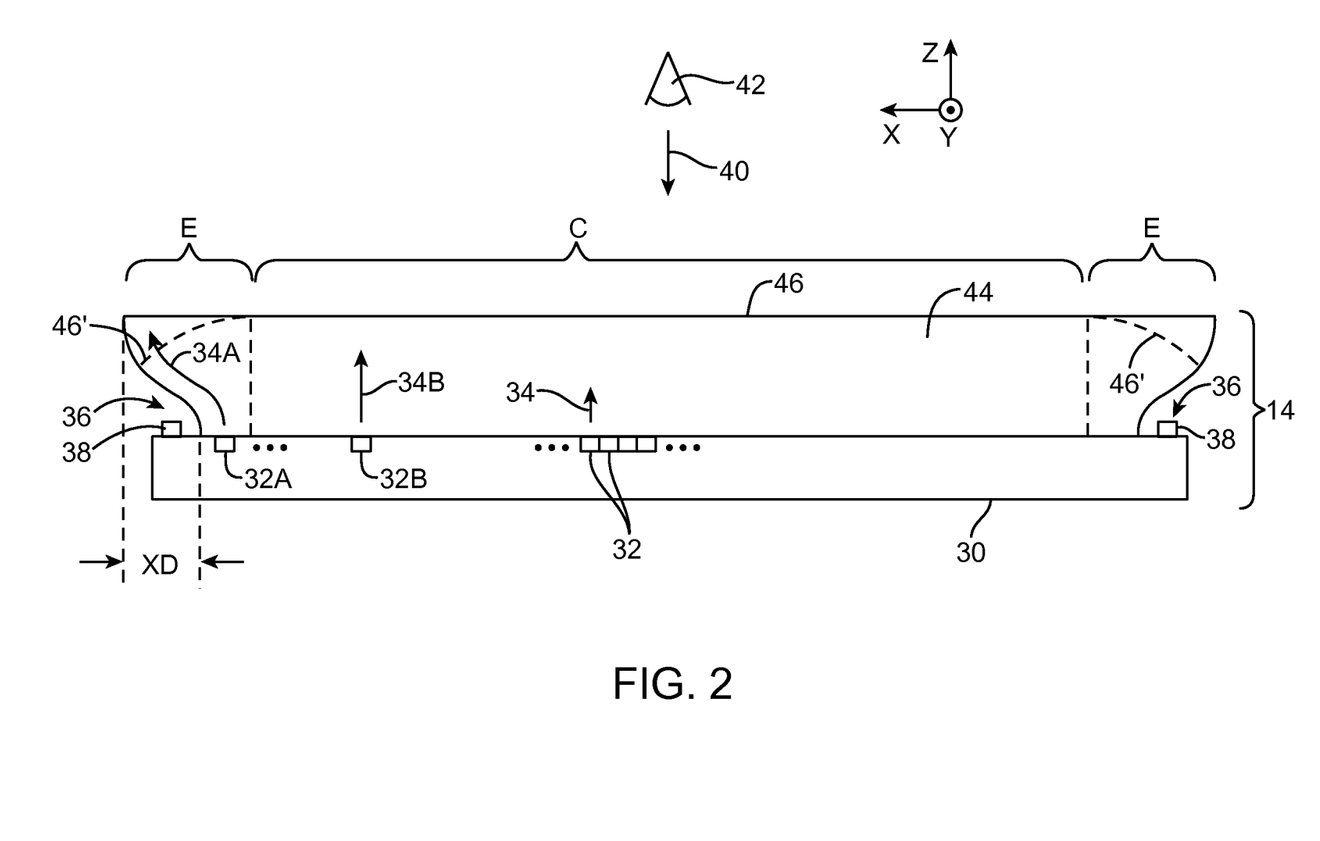
FIG. 2 is a cross-sectional side view of a display with a coherent fiber bundle in accordance with an embodiment of the present invention.

FIG. 2 is a cross-sectional side view of display 14 taken along line 26 and viewed in direction 28. As shown in FIG. 2, display 14 may include display structures 30. Display structures 30 may be formed from organic light-emitting diode structures, backlit electrophoretic display structures, backlight electrowetting display structures, or backlight liquid crystal display (LCD) display layers (as examples). For example, display structures 30 may include liquid crystal display structures such as a color filter layer, a thin-film transistor layer, and a layer of liquid crystal material that is formed between the color filter layer and the thin-film transistor layer.

Display structures 30 may include an array of display pixels 32. When controlled using display driver circuitry, the array of display pixels 32 may be used in presenting images to a viewer such as viewer 42, who is viewing display 14 in direction 40. Circuitry such as display driver circuitry and other display components that do not display images may be located in inactive edge region 36 of display 14. Region 36 may include, for example, a bead of sealant interposed between a color filter layer and a thin-film transistor layer, thin-film transistors (e.g., gate driver circuitry), and traces for providing display control signals to display pixels 32 (shown illustratively as structures 38).

Coherent fiber bundle 44 may have multiple fibers that convey light 34 from pixels 32 vertically upwards to display surface 46. Fiber bundle 44 is coherent in that images that are created by display pixels 34 are not scrambled or otherwise disturbed when passing through fiber bundle 44. Viewer 42 may therefore view satisfactory images on surface 46, including central portion C and edge portions E.

In central portion C of coherent fiber bundle 44, light 34B from display pixels 32B may be conveyed to surface 46 through fibers that extend parallel to one another along dimension Z. In edge regions E, coherent fiber bundle 44 may include fibers that guide light 34A from display pixels 32A to surface 46 along curved paths. The use of curved paths for the fibers in bundle 44 in edge regions E allows edge regions E to overlap inactive display regions 36 when display 14 is viewed in direction 40 by viewer 42, thereby presenting viewer 42 with a borderless display (i.e., a display in which inactive region width W of FIG. 1 is zero with respect to dimension Y and, if desired, with respect to dimension X).

As shown in FIG. 2, for example, the curved nature of the fibers in portion E of coherent fiber bundle 44 may create an overhang that extends by an amount XD over inactive region 36. The amount XD may be sufficient to narrow the size of the inactive display region (region 22 of FIG. 1) in display 14 or may, as shown in FIG. 2, be sufficient to completely cover inactive regions 36 so that display 14 is effectively borderless in dimension Y and, if desired, in dimension X.

Coherent fiber bundle 44 may be formed from a set of parallel fibers. The fibers may be formed from a clear material such as glass. Each fiber may have a core and a cladding. The index of refraction of the core may be greater than the index of refraction of the cladding to promote total internal reflection. Fibers may be heated and manipulated using stretching equipment and/or rollers or other pressing equipment. Glass particles or other binders may be used in binding individual fibers together to form fiber bundle 44. Using fabrication techniques such as these, the fibers in fiber bundle 44 may be positioned so as to follow straight paths (i.e., straight paths such as paths 34B of FIG. 2) or curved paths such as curved path 34A of FIG. 2.

The shape of surface 46 may be planar or may have a curved shape (e.g., along the opposing left and right edges of the display), as illustrated by dotted line 46' of FIG. 2.

Figure 3:
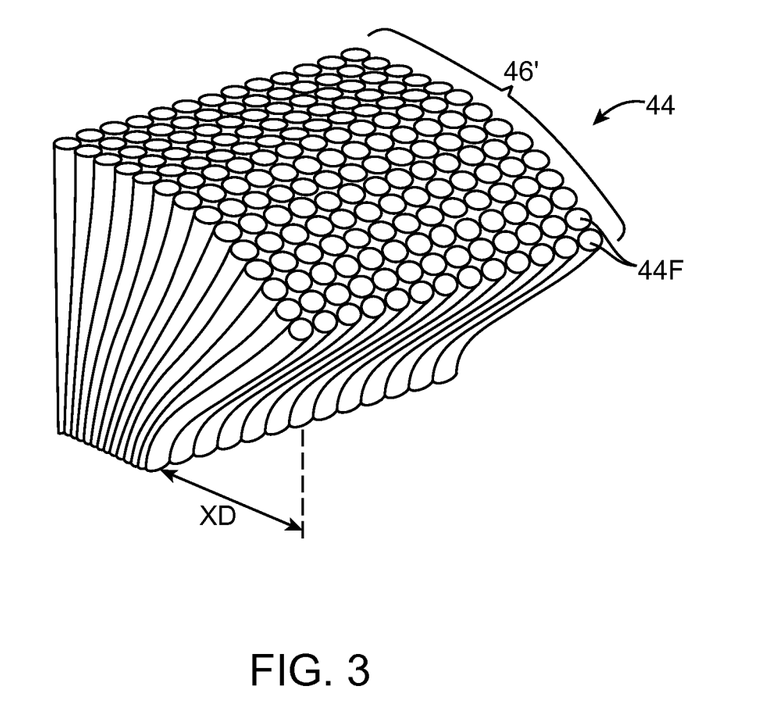
FIG. 3 is a perspective view of a curved edge portion of an illustrative coherent fiber bundle for a display in accordance with an embodiment of the present invention.

FIG. 3 is a perspective view of a portion of coherent fiber bundle 44 in a configuration in which fibers 44F have been shaped to form a curved surface such as surface 46'. Fibers 44F may have a circular cross-sectional shape on surface 46' (as an example). In shapes such as circular or square shapes, a shape may be said to have a 1:1 aspect ratio (width versus length). In elongated shapes such as rectangles or ovals, the aspect ratio of the shape may be different (e.g., 1:3, etc.). In fiber bundle 44, the aspect ratio of the area of the fibers may be constant or may change between the upper and lower surfaces of the bundle.

Figure 4:
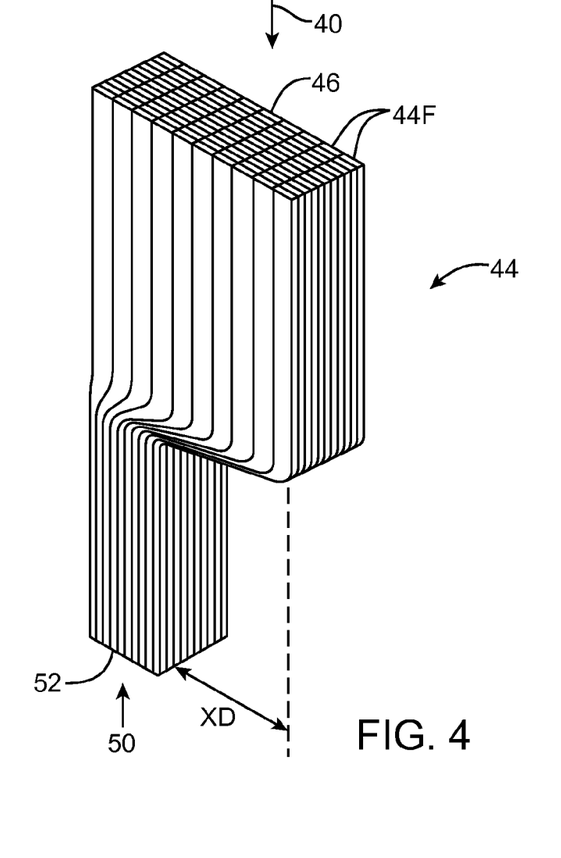
FIG. 4 is a perspective view of an illustrative coherent fiber bundle in accordance with an embodiment of the present invention.

FIG. 4 is a perspective view of portion of coherent fiber bundle 44 in a configuration in which fibers 44F have been shaped to form a flat surface such as surface 46'.

Figure 5:
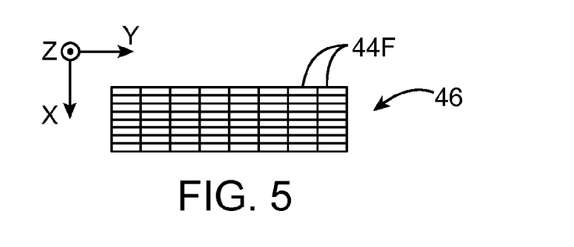
FIG. 5 is a top view of the fiber bundle of FIG. 4 showing how the fiber surfaces at the top of the fiber bundle may have elongated cross-sectional areas in accordance with an embodiment of the present invention.
Figure 6:
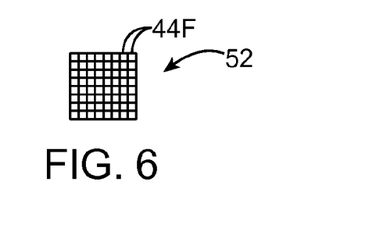
FIG. 6 is a bottom view of the fiber bundle of FIG. 4 showing how the fiber surfaces at the bottom of the fiber bundle may have square cross-sectional shapes in accordance with an embodiment of the present invention.

FIG. 5 is a top view of fiber bundle 44 showing fibers 44F on top surface 46 when viewed in direction 40 of FIG. 4. As shown in FIG. 5, coherent fiber bundle upper surface 46 may have fibers 44F having rectangular areas with an aspect ratio of about 4:1 (e.g., an aspect ratio greater than 1.5:1, greater than 2:1, greater than 3:1, or greater than 5:1). As shown in FIG. 6, coherent fiber bundle lower surface 52 may have fibers 44F that have square areas or areas of other shapes with a 1:1 aspect ratio (e.g., an aspect ratio less than 1.5:1, less than 2:1, less than 3:1, or less than 5:1). By using fiber bundles with changing aspect ratios, it is possible to transition between a relatively smaller area such as lower surface area 52 of coherent bundle 44 of FIG. 4 to a relatively larger area such as upper surface area 46 of coherent bundle 44 of FIG. 4 within edge region E, while retaining a planar shape to upper surface 46. This allows display 14 to have a planar surface that extends from edge to edge.

Figure 7:
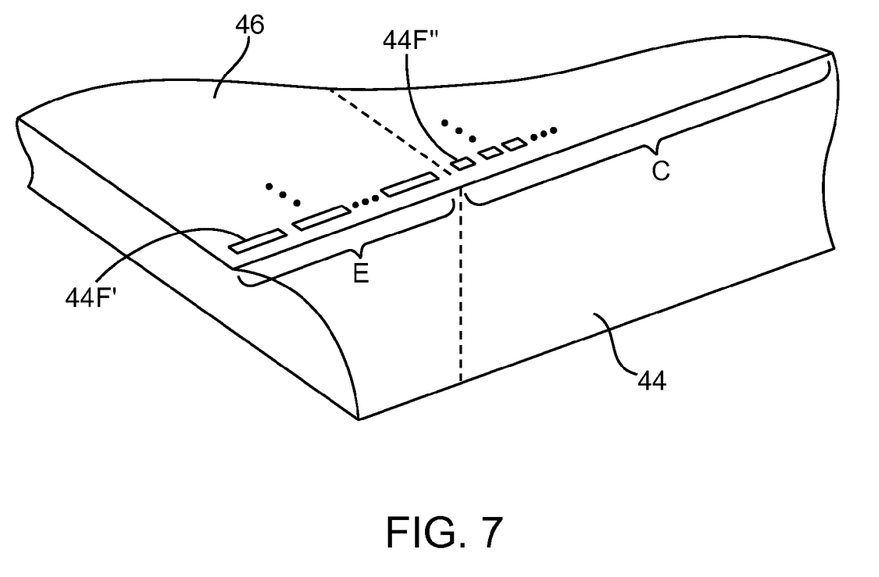
FIG. 7 is a perspective view of an edge portion of a coherent fiber bundle in a display in accordance with an embodiment of the present invention.

As shown in the perspective view of FIG. 7, in portions E, fibers 44F' may have a rectangular cross-sectional area (i.e., elongated aspect ratios), whereas in central region C, the surfaces of fibers 44F" may have 1:1 aspect ratios (e.g., aspect ratios that are less than the aspect ratios of fibers 44F').

Figure 8:
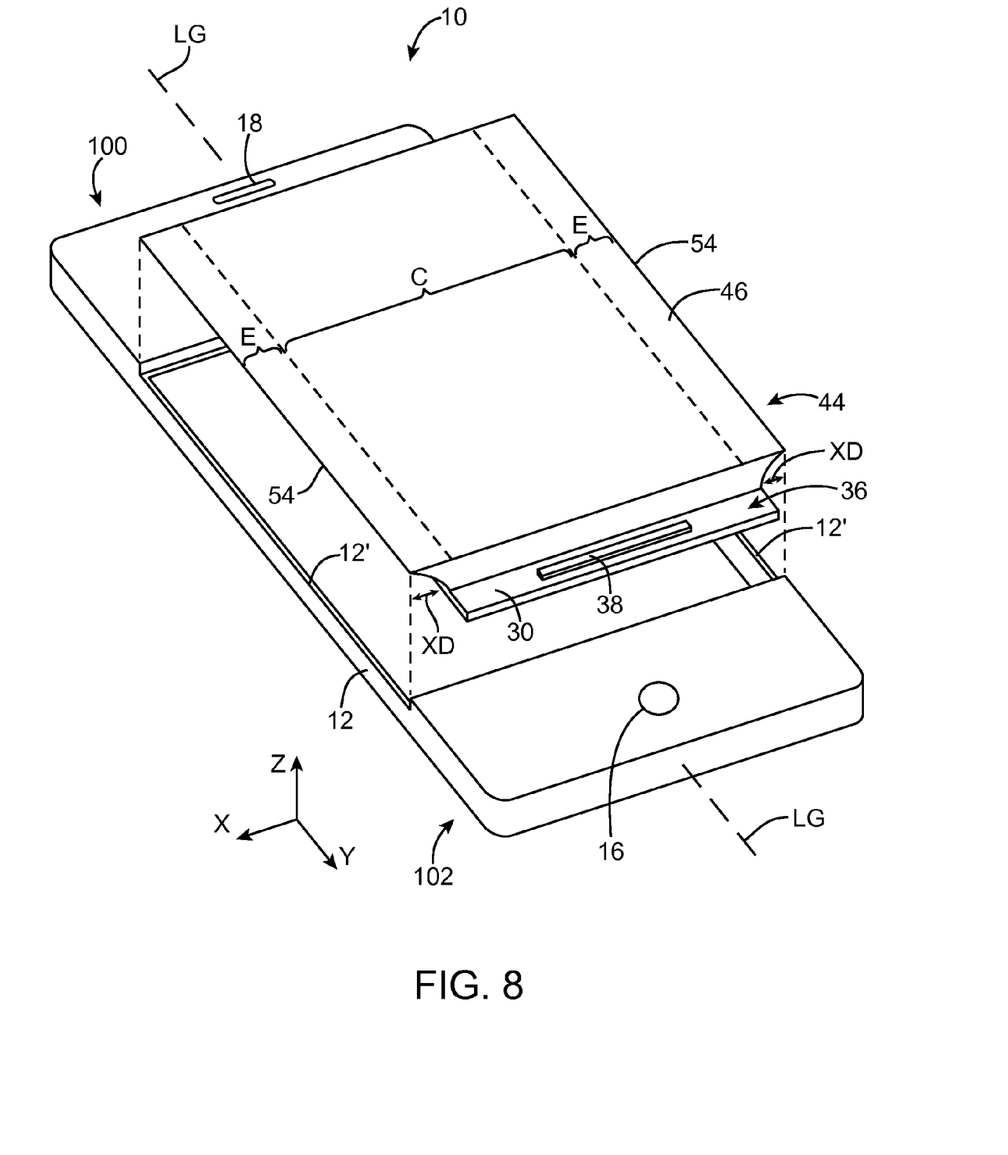
FIG. 8 is an exploded perspective view of an electronic device having a display with a coherent fiber bundle in accordance with an embodiment of the present invention.

FIG. 8 is a perspective view of device 10 showing how display 14 may have edges E that extend laterally in dimension Y so as to create overhang XD in dimension Y. This allows display 14 to be borderless or nearly borderless in dimension Y. Device housing 12 may have sidewall edges 12' that run parallel to each along longitudinal axis LG of device 10 between lower end 102 and upper end 100 of device 10. If desired, left and right edges 54 may overlap edges 12' of housing 12 in device 10, so that display 14 appears borderless in dimension Y.

In dimension X, inactive portions 36 of display structures 30 (e.g., a thin-film transistor layer and/or other layers in display 14) may be used to accommodate components 38 such as driver integrated circuits, flexible printed circuit cable attachment patterns, or traces for distributing display control signals to transistors in the active portion of the display. Inactive portions 36 may also extend under edges E of fiber bundle 44. In this portion of inactive portions 36, thin-film transistor circuitry (e.g., for gate driver circuits), liquid crystal display sealant beads, and other inactive structures may be formed on display layers 30.

Figure 9:
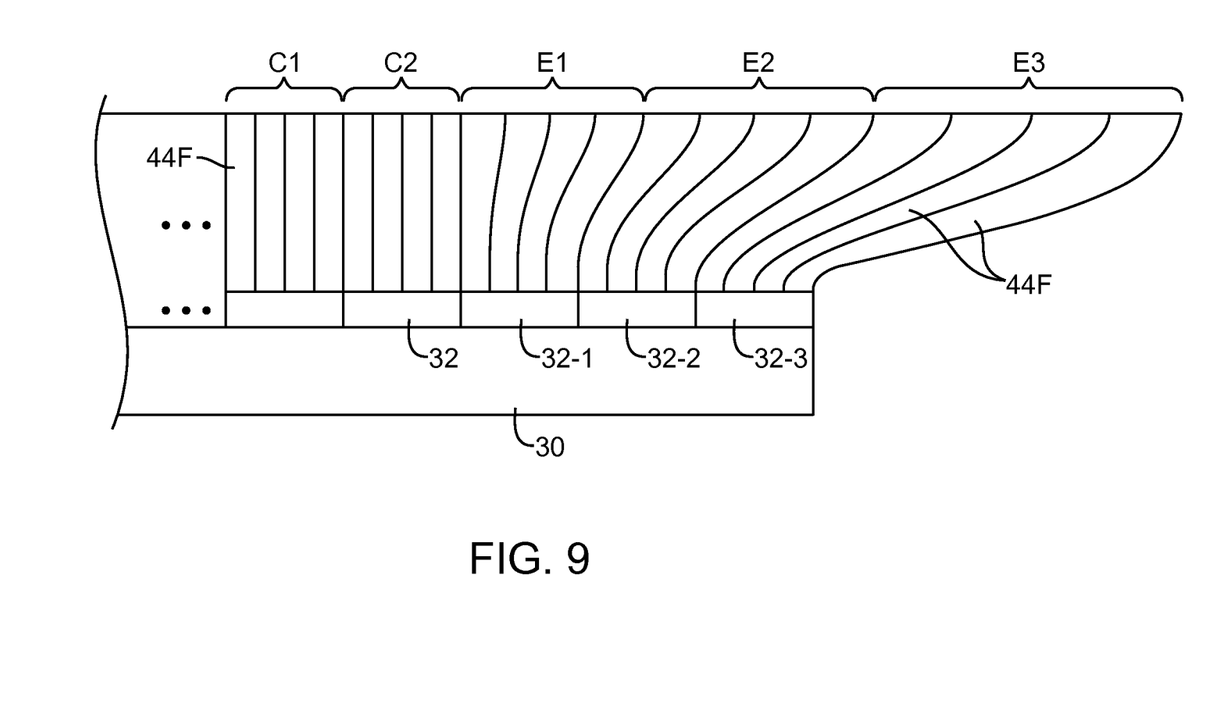
FIG. 9 is a cross-sectional side view of a coherent fiber bundle in which fibers have cross-sectional areas with varying aspect ratios in accordance with an embodiment of the present invention.

FIG. 9 is a cross-sectional side view of coherent fiber bundle 44 showing how multiple fibers 44F may be associated with each display pixel 32. In regions such as edge regions E1, E2, and E3, the shape of the surface area of each fiber 44F may be elongated (with an aspect ratio of 2:1 or more, as an example), as shown in FIG. 5. Regions E1, E2, and E3 are associated respectively with display pixels 32-1, 32-2, and 32-3. For example, the light produced by pixel 32-3 may be displayed in region E3 after being conveyed through the fibers 44F that overlap pixel 32-3. The use of larger aspect ratios for the surfaces of fibers 44F in regions E1, E2, and E3 allows upper surface 46 of display 14 to be planar (if desired). In central regions such as C1 and C2, fibers 44F may extend vertically upwards. There is some loss of display resolution in regions E1, E2, and E3 relative to in regions C1 and C2, but the information displayed in edge regions E1, E2, and E3 of display 14 may often contain solid colors or other low-information-content material, where the loss of resolution is immaterial to the performance of display 14.

Figure 10:
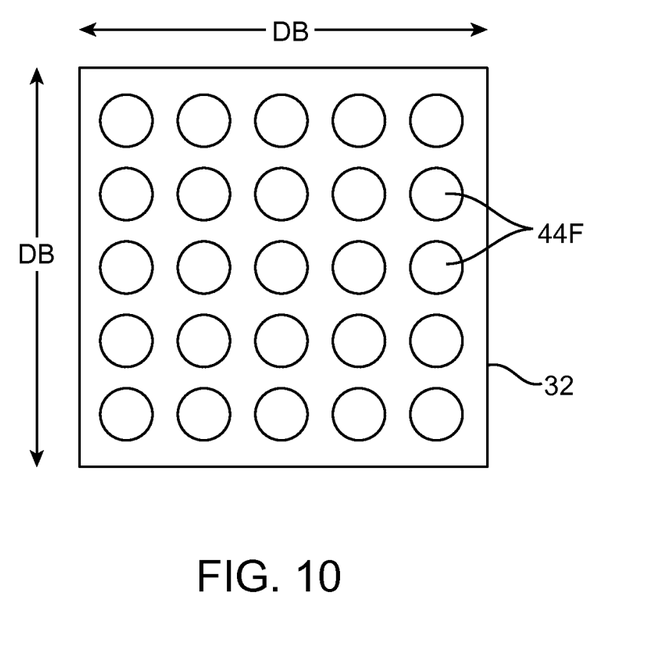
FIG. 10 is a top view of an illustrative display pixel showing how multiple fibers may overlap each pixel in a display in accordance with an embodiment of the present invention.

FIG. 10 is a top view of an illustrative display pixel showing how multiple fibers 44F may be associated with a single pixel. Each display pixel such as display pixel 32 of FIG. 10 may be associated with about N×N fibers 44F. As an example, a set of about 10-50 fibers 44F may be used to route light from each display pixel to the surface of coherent fiber bundle 46. Configurations in which a single fiber is associated with each display pixel or in which other numbers of fibers are associated with each display pixel may also be used, if desired.

Figure 11:
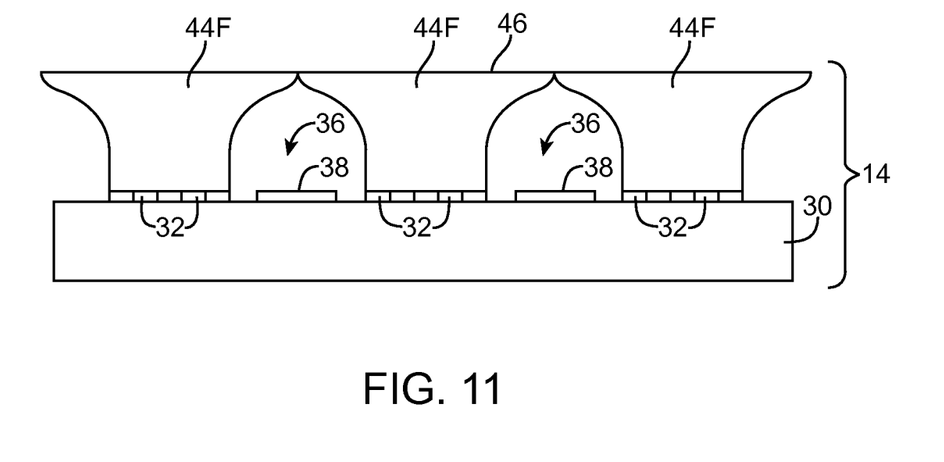
FIG. 11 is a cross-sectional side view of a display having multiple adjacent coherent fiber bundles in accordance with an embodiment of the present invention.

As shown in FIG. 11, multiple coherent fiber bundles such as bundles 44A, 44B, and 44C may be mounted adjacent to each other so that their peripheral edges (e.g., their left and right edges) may mate with each other, forming surface 46 of display 14 from multiple bundle surfaces. Inactive regions 36 on display layer 30 may be used for mounting components 38.

Figure 12:
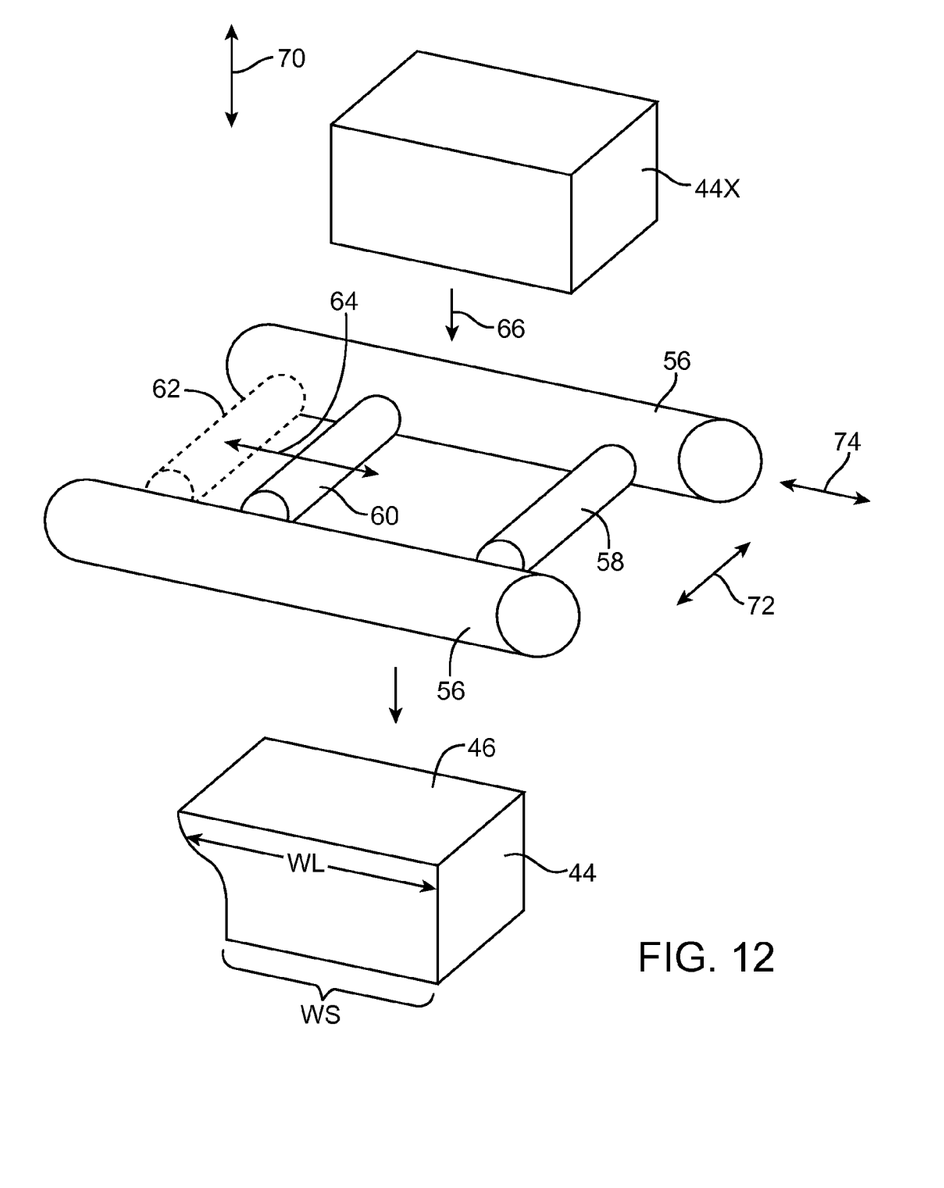
FIG. 12 is a diagram of illustrative equipment that may be used in forming a coherent fiber bundle having fibers with cross-sectional areas of varying aspect ratios in accordance with an embodiment of the present invention.

A system for forming a coherent fiber bundle of the type shown in FIG. 4 is shown in FIG. 12. Initially, fiber bundle 44X may have fibers 44F that are aligned along dimension 70. Heated rollers 56 may be used to constrain fiber bundle 44X with respect to dimension 72. Rollers 58 and 60 may be used to squeeze fiber bundle 44X in dimension 74. For example, roller 60 may be moved along directions 64 between position 62 and the position shown in FIG. 12 in order to apply pressure to fiber bundle 44X as fiber bundle 44X is moved through the roller system in direction 66. Upon exiting the rollers in direction 78, fiber bundle 44 may have the appearance shown in the bottom portion of FIG. 12 in which upper surface 46 has a larger width WL than lower surface width WS (see, e.g., fiber bundle 44 of FIG. 4).

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a housing having first and second ends and having first and second sidewalls that run parallel to each other between the first and second ends, wherein the first and second sidewalls have respective first and second top surfaces;
   display structures that include an array of display pixels interposed between the first and second sidewalls, wherein the array of display pixels are positioned below the respective first and second top surfaces of the first and second sidewalls; and
   a fiber bundle on the array of display pixels, wherein the fiber bundle has edge portions that overlap the first and second sidewalls, wherein the edge portions are positioned above the respective first and second top surfaces of the first and second sidewalls, wherein the fiber bundle forms a display surface which is viewed by a user, and wherein the display surface is curved in the edge portions of the fiber bundle.

2. The electronic device defined in claim 1 wherein the fiber bundle has a lower surface adjacent to the display structures and an upper surface, wherein the display pixels are configured to display an image, and wherein the fiber bundle is configured to route the image from the lower surface to the upper surface.

3. The display defined in claim 1 wherein each display pixel provides light to a respective plurality of the fibers in the fiber bundle.

4. The display defined in claim 1 wherein the fiber bundle comprises a plurality of fibers, wherein each fiber of the plurality of fibers includes an upper surface with a first cross-sectional area and a lower surface with a second cross-sectional area, and wherein the first cross-sectional area has a larger aspect ratio than the second cross-sectional area.

5. The display defined in claim 1 wherein the fiber bundle includes a central portion with a planar surface.

6. The display defined in claim 5 wherein the fiber bundle has a first edge portion that runs along one side of the central portion and a second edge portion that runs along an opposing side of the central portion and wherein the first and second edge portions have curved surfaces.

7. The electronic device defined in claim 1, wherein the display surface has a planar portion interposed between the edge portions of the fiber bundle.

8. A display, comprising:
   a display layer that includes an array of display pixels;
   at least one component in an inactive edge portion of the display layer; and
   a fiber bundle having a first plurality of fibers that overlap only the display pixels and a second plurality of fibers that overlap the display pixels and the inactive edge portion of the display layer, wherein each fiber of the first plurality of fibers has a first surface adjacent the display pixels and a second surface at a display surface of the fiber bundle, wherein each fiber of the first plurality of fibers has a first cross-sectional area on the first surface and a second cross-sectional area on the second surface, wherein the first cross-sectional area has the same aspect ratio as the second cross-sectional area, wherein each fiber of the second plurality of fibers has a third surface adjacent the display pixels and a fourth surface at the display surface of the fiber bundle, wherein each fiber of the second plurality of fibers has a third cross-sectional area on the third surface and a fourth cross-sectional area on the fourth surface, wherein the fourth cross-sectional area has a larger aspect ratio than the third cross-sectional area, wherein the fiber bundle forms a display surface which is viewed by a user, and wherein the display surface is curved in portions of the fiber bundle formed by the second plurality of fibers.

* * * * *

UNITED STATES PATENT AND TRADEMARK OFFICE
CERTIFICATE OF CORRECTION

Page 1 of 1

PATENT NO. : 9,435,939 B2
APPLICATION NO. : 13/564995
DATED : September 6, 2016
INVENTOR(S) : Tseng-Mau Yang et al.

It is certified that error appears in the above-identified patent and that said Letters Patent is hereby corrected as shown below:

In the Claims

Column 6:

Line 29, In Claim 3, Line 1, "The display" should read --The electronic device--.

Line 32, In Claim 4, Line 1, "The display" should read --The electronic device--.

Line 39, In Claim 5, Line 1, "The display" should read --The electronic device--.

Line 41, In Claim 6, Line 1, "The display" should read --The electronic device--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*